United States Patent
Hipp et al.

(10) Patent No.: US 12,049,183 B2
(45) Date of Patent: Jul. 30, 2024

(54) MOUNTING SYSTEM

(71) Applicant: ACPS Automotive GmbH, Ingersheim (DE)

(72) Inventors: Alexander Hipp, Tamm (DE); Aleksej Kadnikov, Leonberg (DE); Bernhard Rimmelspacher, Rheinstetten (DE)

(73) Assignee: ACPS Automotive GmbH, Ingersheim (DE)

( * ) Notice: Subject to any disclaimer, the term of this patent is extended or adjusted under 35 U.S.C. 154(b) by 356 days.

(21) Appl. No.: 17/463,788

(22) Filed: Sep. 1, 2021

(65) Prior Publication Data
US 2022/0063361 A1 Mar. 3, 2022

(30) Foreign Application Priority Data
Sep. 2, 2020 (DE) .......................... 102020122965.8

(51) Int. Cl.
*B60R 19/48* (2006.01)
*B60D 1/48* (2006.01)
*B60D 1/56* (2006.01)

(52) U.S. Cl.
CPC .............. *B60R 19/48* (2013.01); *B60D 1/485* (2013.01); *B60D 1/56* (2013.01)

(58) Field of Classification Search
CPC ................................ B60R 19/34; B60R 19/24
USPC ........................................ 293/155, 134, 133
See application file for complete search history.

(56) References Cited

U.S. PATENT DOCUMENTS

| | | | | |
|---|---|---|---|---|
| 4,239,253 A * | 12/1980 | Golze | .................... | G01G 19/08 116/28 R |
| 4,950,010 A * | 8/1990 | Denny | .................... | B60R 19/48 280/460.1 |
| 8,038,186 B2 * | 10/2011 | Roth | ....................... | B60R 19/48 52/843 |
| 2003/0132259 A1 * | 7/2003 | McLemore | ............... | B60R 9/10 224/924 |
| 2004/0040995 A1 * | 3/2004 | Ferrigan | ................ | B60D 1/075 280/495 |

FOREIGN PATENT DOCUMENTS

| | | |
|---|---|---|
| DE | 4403715 A1 | 8/1995 |
| DE | 10061954 A1 | 6/2002 |
| DE | 10110332 A1 | 9/2002 |
| DE | 102004033809 A1 | 2/2006 |
| DE | 102005040182 A1 | 3/2007 |
| DE | 102012013847 A1 | 1/2014 |
| DE | 102019208542 A1 | 12/2020 |

(Continued)

*Primary Examiner* — Dennis H Pedder
(74) *Attorney, Agent, or Firm* — Reinhart Boerner Van Deuren P.C.

(57) ABSTRACT

In order to improve a mounting system for a load carrier or a trailer coupling, comprising at least one mounting receptacle, which can be mounted on a rear section of a motor vehicle body, in such a way that a high weight saving is made possible, in particular in the case when a load carrier or a trailer coupling is not being used, it is proposed that the mounting system has a set of two mounting receptacles, which is configured such that each of the mounting receptacles in the mounted state is connected to the motor vehicle body by means of a mounting region for a rear-side impact or crash element provided on the motor vehicle body.

28 Claims, 15 Drawing Sheets

(56) References Cited

FOREIGN PATENT DOCUMENTS

| | | |
|---|---|---|
| EP | 3023302 A2 | 5/2016 |
| GB | 2225299 A | 5/1990 |
| JP | 2009262660 A | 11/2009 |
| JP | 2015189446 A | 11/2015 |

* cited by examiner

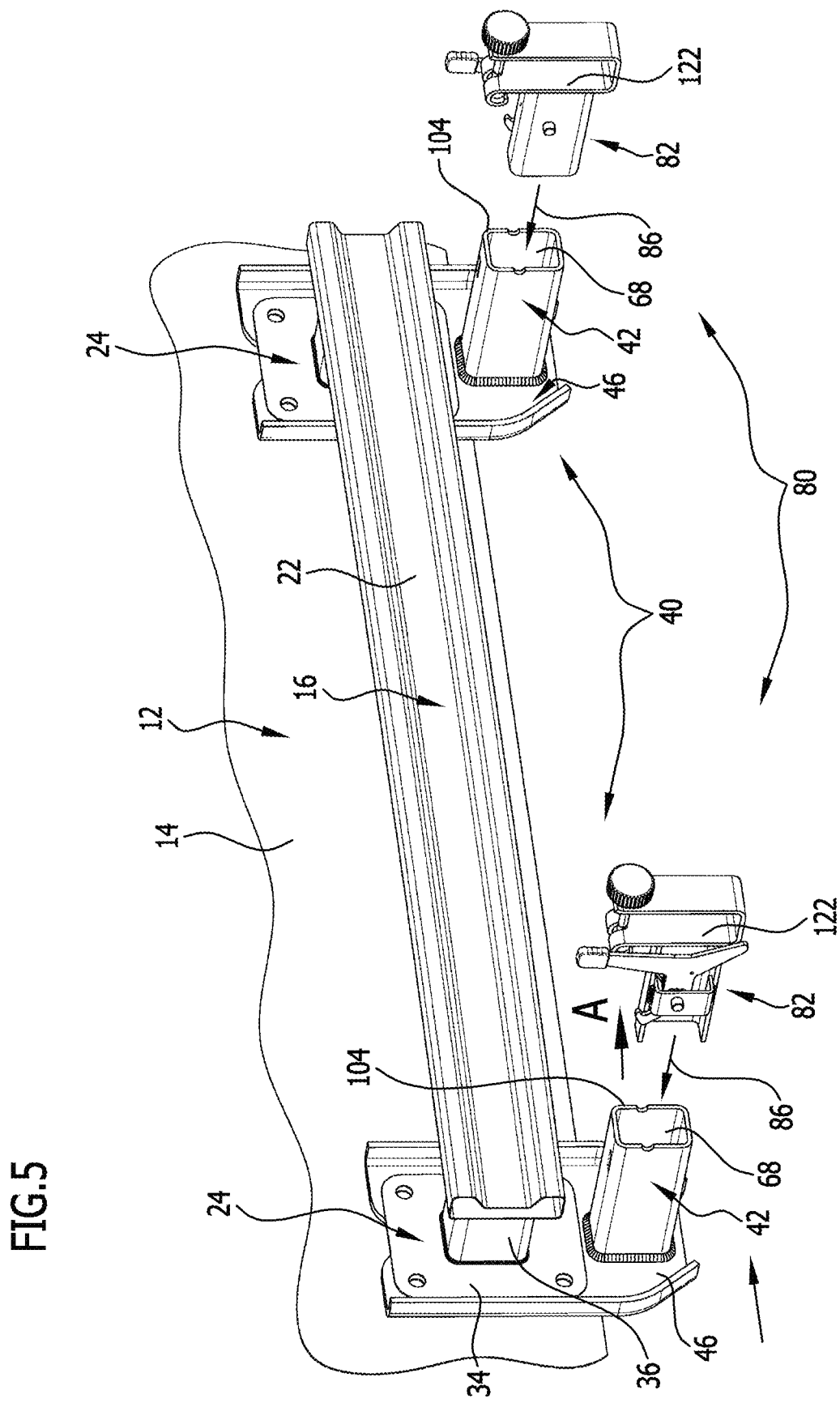

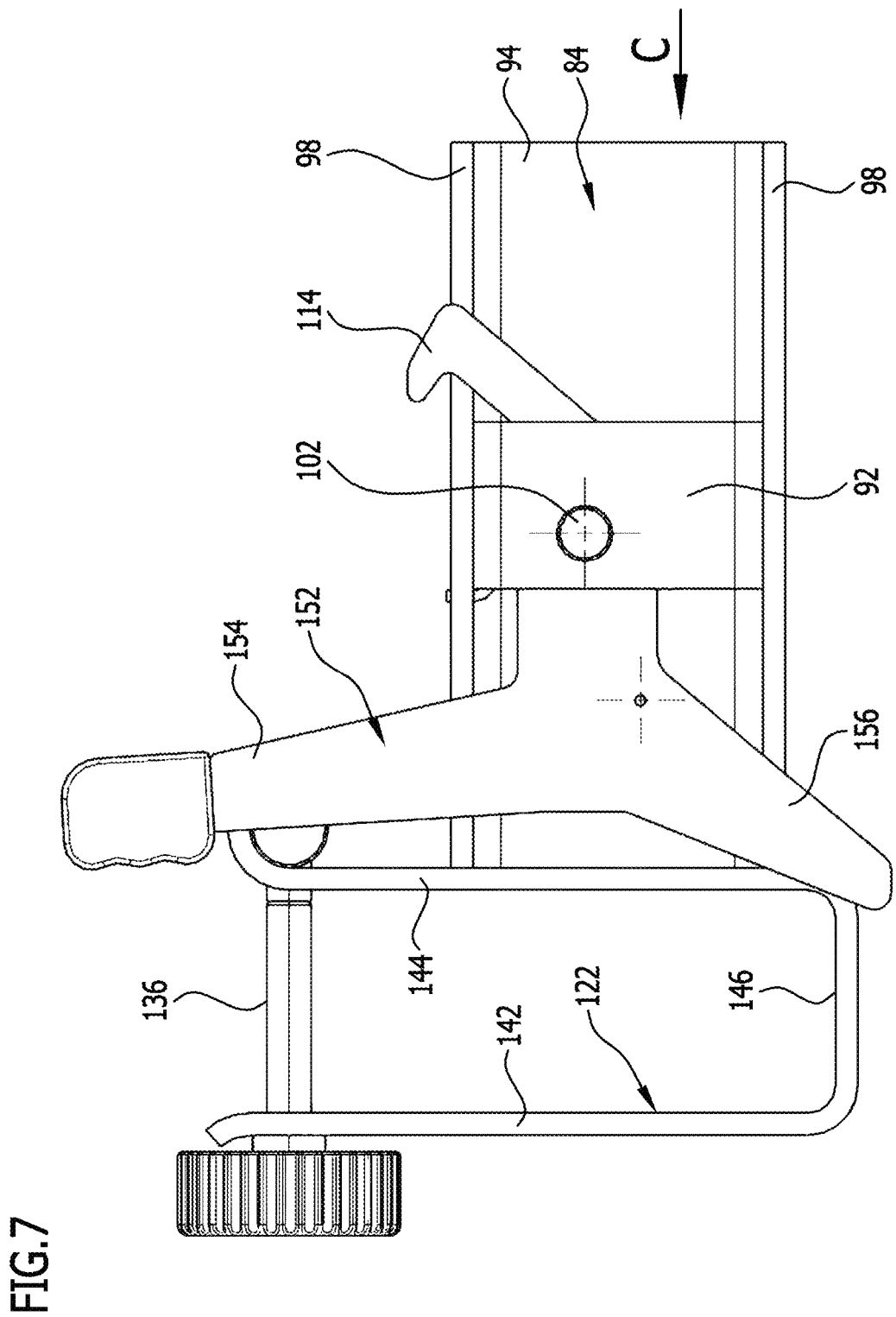

MOUNTING SYSTEM

CROSS-REFERENCE TO RELATED PATENT APPLICATION

This patent application claims the benefit of German application No. 10 2020 122 965.8, filed Sep. 2, 2020, the teachings and disclosure of which are hereby incorporated in their entirety by reference thereto.

BACKGROUND OF THE INVENTION

The invention relates to a mounting system for a load carrier or a trailer coupling, comprising at least one mounting receptacle, which is mountable on a rear section of a motor vehicle body.

Such mounting systems are known from the prior art.

These usually use a cross-member, which can be mounted on the rear section, carries the mounting receptacle and on which the load carrier or the trailer coupling are then fixable.

These solutions are known from the prior art, but lead to a significant increase of the vehicle weight, in particular if a load carrier or trailer coupling is not being used.

These solutions are then less suitable, in particular if weight-reduced solutions are required, for example also in the case of electric cars.

The object of the invention is therefore to create a mounting system of the kind described at the outset which allows a very high weight saving, in particular in the case that a load carrier or a trailer coupling is not being used.

SUMMARY OF THE INVENTION

In a mounting system of the kind described at the outset, this object is achieved in accordance with the invention in that the mounting system has a set of two mounting receptacles, which is configured such that each of the mounting receptacles in the mounted state is connected to the motor vehicle body by means of a mounting region for a rear-side impact or crash element provided on the motor vehicle body.

This solution has the great advantage that a simple attachment to the rear section of the motor vehicle can be achieved by means of the mounting regions for the rear-side impact or crash element and in particular is possible together therewith.

It is particularly favorable here if the impact or crash element has a carrier that is deformable in the event of an impact or crash and that is connected by means of mounting attachments to the mounting regions of the motor vehicle body.

A carrier of this kind has the advantage that it can deform, at least within limits, independently of the rear section of the motor vehicle and can thus absorb impact and/or crash energy.

The mounting receptacles are particularly advantageously connected to the mounting region in each case by means of a mounting carrier, by means of which the mounting receptacle is connectable or, in the mounted state, is connected to the corresponding mounting region.

Here, the mounting receptacles are preferably arranged next to the mounting attachments of the impact or crash element by the mounting carrier, so that there is thus no need for any structural changes to the impact or crash element with its mounting attachments, and instead the mounting receptacles can in turn be made accessible as a result of their arrangement next to the mounting attachments of the impact or crash element.

It is particularly favorable if the mounting receptacles are arranged, by means of the mounting carrier, below the mounting attachments of the impact or crash element in the direction of the force of gravity.

In order to make the mounting carrier on the one hand as simple as possible and on the other hand as stable as possible, it is preferably provided that the mounting carrier is fixed between a mounting attachment of the impact or crash element and the corresponding mounting region of the motor vehicle body for connection to the mounting regions of the motor vehicle body, in particular is clamped between the corresponding mounting attachment and the corresponding mounting region, and is fixed on the mounting region together with the mounting attachment by the connection of the corresponding mounting attachment to the mounting region, for example by means of screws.

A wide range of different possibilities are conceivable in respect of the configuration of the mounting carrier.

An advantageous solution provides that the mounting carrier has a central body which is stabilized by at least one reinforcement.

Here, it is preferably provided that the central body has a support region, which is fixable between the mounting region and the corresponding mounting attachment.

To save weight, the central body can be provided with one or more recesses.

A central body of this kind should be as flat as possible so as not to negatively influence the connection between the mounting region and the mounting attachment.

For this reason, the at least one reinforcement runs outside the support region.

It is furthermore preferably provided that the central body has a holding region, which carries the mounting receptacle.

In order to also configure a holding region of this kind as simply as possible, it is also provided that the at least one reinforcement runs outside the holding region.

It is also possible, however, to connect the at least one reinforcement to the mounting receptacle.

A solution in which the support region and the holding region are connected to one another in a rigid manner by the at least one reinforcement is particularly favorable.

No further details have yet been provided in respect of the configuration and use of the mounting receptacles.

It is particularly favorable if each of the mounting receptacles is connectable to a mounting element for mounting a load carrier or a trailer coupling.

A mounting element of this kind can be connected to the mounting receptacles in a very many ways.

A particularly simple and in particular weight-saving solution provides that the mounting receptacles are sleeve-like, so that the mounting elements are insertable into them or attachable to them.

It is particularly favorable if mounting elements can be inserted into the mounting receptacles and can be fixed therein, which mounting elements are in turn provided in particular with load receptacles, which allow a connection to a load carrier or a trailer coupling.

In order to provide a secure mounting of each mounting element on its corresponding mounting receptacle, it is preferably provided that each mounting element has a guide body, by means of which the mounting element is insertable in an insertion direction into the mounting receptacle or placeable thereon and is fixable thereto against transverse movements and/or rotations about the insertion direction.

It is also preferably provided that, by means of stops, each mounting element is positionable in a defined manner in the insertion direction relative to the corresponding mounting receptacle.

In order to be able to fix the mounting element in the mounting receptacle, each mounting element is preferably provided with a securing unit, in which the mounting element is fixable, in the position inserted into the mounting receptacle, against a movement opposite the insertion direction.

An advantageous solution provides that the securing unit has a securing body, which is configured to be brought into engagement with a securing receptacle, for example a recess, of the mounting receptacle.

In addition, it is preferably provided that a carrier base of a load carrier or of a trailer coupling is fixable in the load receptacle of each mounting element.

This means that the load receptacle itself in turn merely represents a receptacle for a carrier base of a load carrier or of the trailer coupling.

In principle, the mounting elements can be connected, for example fixedly connected, to the carrier base of the load carrier or of the trailer coupling.

It is also possible, however, to make the load receptacles such that the carrier base of the load carrier or of the trailer coupling, once the mounting elements have been inserted into the mounting receptacles, is fixable in a force-locking and/or positive-locking manner or, in the operating state, is fixed in a force-locking and/or positive-locking manner.

An advantageous and in particular easily realized solution provides that there are associated with each load receptacle clamping elements, by means of which the carrier base is fixable in the corresponding load receptacle, as applicable in a force-locking addition to a positive engagement.

This is possible, for example, since the clamping elements act directly on the carrier base.

It is also conceivable, however, that the clamping elements deform the load receptacle itself in such a way that the carrier base is clampable by the load receptacle.

An advantageous configuration of a load receptacle of this kind provides that this is U-shaped, for example in order to receive the carrier base.

In order to also ensure that the securing body, when the load carrier is mounted or when the trailer coupling is mounted, remains engaged with the securing receptacle in the mounting receptacle, it is preferably provided that the securing body is blocked by a blocking element against a movement out from the securing receptacle, when the load carrier or the trailer coupling is held in the respective load receptacle, in particular is held by means of the carrier base.

Another advantageous solution provides that the set of two mounting receptacles is held on the impact or crash element, that is to say is directly connected to the impact or crash element. This can be an indirect, releasable connection, for example by means of a mounting carrier, or a direct connection, for example by joining.

A preferred solution in this case provides that the mounting receptacles are connected to the carrier of the impact or crash element. This can be an indirect, releasable connection, for example by means of a mounting carrier, or a direct connection, for example by joining.

Here, the mounting receptacles can be arranged for example on the carrier in continuation of the mounting attachments, so that in particular the mounting attachments can be configured such that they likewise also form the mounting receptacles.

Another advantageous solution provides that the mounting receptacles are arranged offset relative to the mounting attachments of the impact or crash element.

In principle, the mounting receptacles could be arranged on the carrier such that they are held releasably thereon, for example by screwing.

Another advantageous solution provides that the mounting receptacles are connected non-releasably to the carrier of the impact or crash element, that is to say for example are welded thereto.

The above description of solutions according to the invention thus comprises, in particular, the various combinations of features defined by the following consecutively numbered embodiments:

1. A mounting system (40) for a load carrier (140) or a trailer coupling (160), comprising at least one mounting receptacle (42), which is mountable on a rear section (14) of a motor vehicle body (12), wherein the mounting system has a set (40) of two mounting receptacles (42), which is configured such that each of the mounting receptacles (42), in the mounted state, is connected to the motor vehicle body (12) by means of a mounting region (26) for a rear-side impact or crash element (16) provided on the motor vehicle body (12).

2. A mounting system in accordance with embodiment 1, wherein the impact or crash element (16) has a carrier (22) that is deformable in the event of an impact or crash and that is connected by means of mounting attachments (24) to the mounting regions (26) of the motor vehicle body (12).

3. A mounting system in accordance with embodiment 1 or 2, wherein each mounting receptacle (42) is connectable or, in the mounted state, is connected to the corresponding mounting region (26) by means of a mounting carrier (46).

4. A mounting system in accordance with the preceding embodiments, wherein the mounting receptacles (42) are arranged next to the mounting attachments (24) of the impact or crash element (16) by the mounting carrier (46).

5. A mounting system in accordance with embodiment 4, wherein the mounting receptacles (42) are arranged, by means of the mounting carrier (46), below the mounting attachments (24) of the impact or crash element (16) in the direction of the force of gravity.

6. A mounting system in accordance with the preceding embodiments, wherein the mounting carrier (46) for connection to the mounting regions (26) of the motor vehicle body (12) is fixed between a mounting attachment (24) of the impact or crash element (16) and the corresponding mounting region (26) of the motor vehicle body (12).

7. A mounting system in accordance with embodiments 3 to 6, wherein the particular mounting carrier (46) has a central body (52), which is stabilized by at least one reinforcement (54).

8. A mounting system in accordance with embodiment 7, wherein the central body (52) has a support region (56), which is fixable between the mounting region (26) and the corresponding mounting attachment (24).

9. A mounting system in accordance with embodiment 7 or 8, wherein the central body (52) has a holding region (66), which carries the mounting receptacle (42).

10. A mounting system in accordance with embodiment 8 or 9, wherein the support region (56) and the holding region (66) are connected to one another in a rigid manner by the at least one reinforcement (54).

11. A mounting system in accordance with the preceding embodiments, wherein each of the mounting receptacles (42) is connectable to a mounting element (82).

12. A mounting system in accordance with embodiment 11, wherein the mounting receptacles (42) are sleeve-like.

13. A mounting system in accordance with embodiment 11 or 12, wherein mounting elements (82) are insertable into the mounting receptacles (42) or placeable thereon and fixable thereto, which mounting elements are in turn provided with load receptacles (122), which allow a connection to a load carrier (130) or a trailer coupling (160).

14. The mounting system in accordance with embodiment 12 or 13, wherein each mounting element (82) has a guide body (84), by means of which the mounting element (82) is insertable in an insertion direction (86) into the mounting receptacle (42) or is placeable thereon and is fixable thereto against transverse movements and/or rotations about the insertion direction (86).

15. A mounting system in accordance with embodiments 12 to 14, wherein, by means of stops (102), each mounting element (82) is positionable in a defined manner in the insertion direction (86) relative to the corresponding mounting receptacle (42).

16. A mounting system in accordance with embodiments 12 to 15, wherein each mounting element (82) is provided with a securing unit (112), by means of which the mounting element is fixable, in the position inserted into the mounting receptacle (42), against a movement opposite the insertion direction (86).

17. A mounting system in accordance with embodiment 16, wherein the securing unit (112) has a securing body (114), which is configured to be brought into engagement with a securing receptacle (116) of the mounting receptacle (42).

18. A mounting system in accordance with embodiments 12 to 17, wherein a carrier base (132) of a load carrier (130) or of a trailer coupling (160) is fixable or, in the operating state, is fixed in the load receptacle (122) of each mounting element (82).

19. A mounting system in accordance with embodiments 12 to 18, wherein there are associated with each load receptacle (142) clamping elements (136), by means of which the carrier base (132) is fixable in a force-locking manner in the respective load receptacle (122).

20. A mounting system in accordance with embodiments 12 to 19, wherein each load receptacle (122) is U-shaped, for example in order to receive the carrier base (132).

21. A mounting system in accordance with the preceding embodiments, wherein the securing body (114) is blocked by a blocking element (156) against a movement out from the securing receptacle (116) when the load carrier (130) or the trailer coupling (160) is held in the corresponding load receptacle (122).

22. A mounting system in accordance with the preceding embodiments, wherein the set of two mounting receptacles (42) is held on the impact or crash element (16).

23. A mounting system in accordance with embodiment 22, wherein the mounting receptacles (42) are connected to the carrier (22) of the impact or crash element (16).

24. A mounting system in accordance with embodiments 21 to 23, wherein the mounting receptacles (42) are arranged on the carrier (22) in continuation of the mounting attachments (24).

25. A mounting system in accordance with embodiments 21 to 23, wherein the mounting receptacles (42) are arranged offset relative to the mounting attachments (24) of the impact or crash element (16).

26. A mounting system in accordance with embodiments 22 to 25, wherein the mounting receptacles (42) are connected non-releasably to the carrier (22) of the impact or crash element (16).

Further features and advantages of the invention are the subject of the following description and also the representation of some exemplary embodiments in the drawings.

BRIEF DESCRIPTION OF THE DRAWINGS

FIG. 5 a representation similar to FIG. 2 prior to insertion of mounting elements into the mounting receptacles;

FIG. 7 a plan view of the mounting element with a view in the direction of the arrow B in FIG. 6;

DETAILED DESCRIPTION OF THE INVENTION

Figure 1:
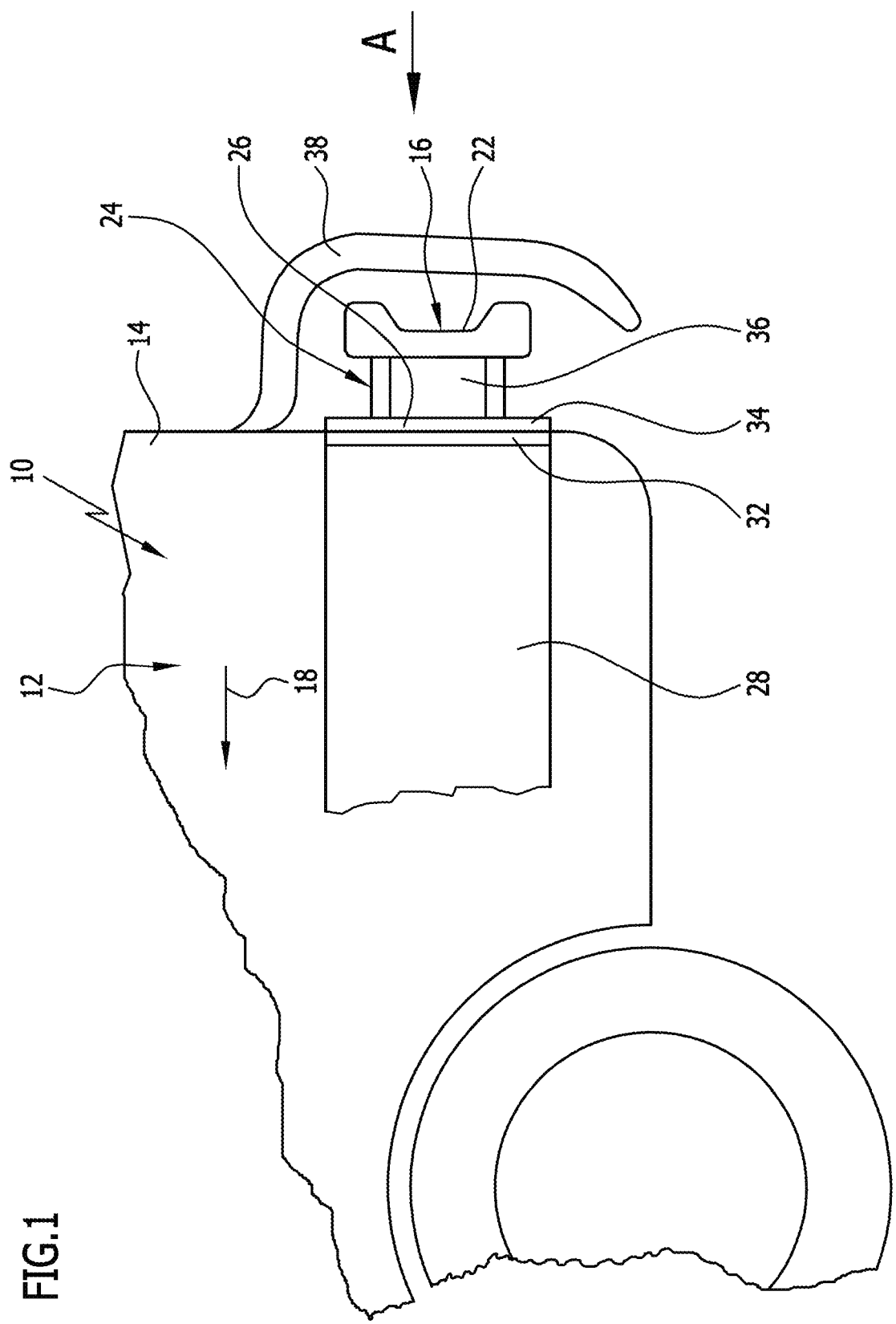
FIG. 1 a side view of a rear section of a motor vehicle with an impact or crash element mounted thereon below a bumper unit.
Figure 2:
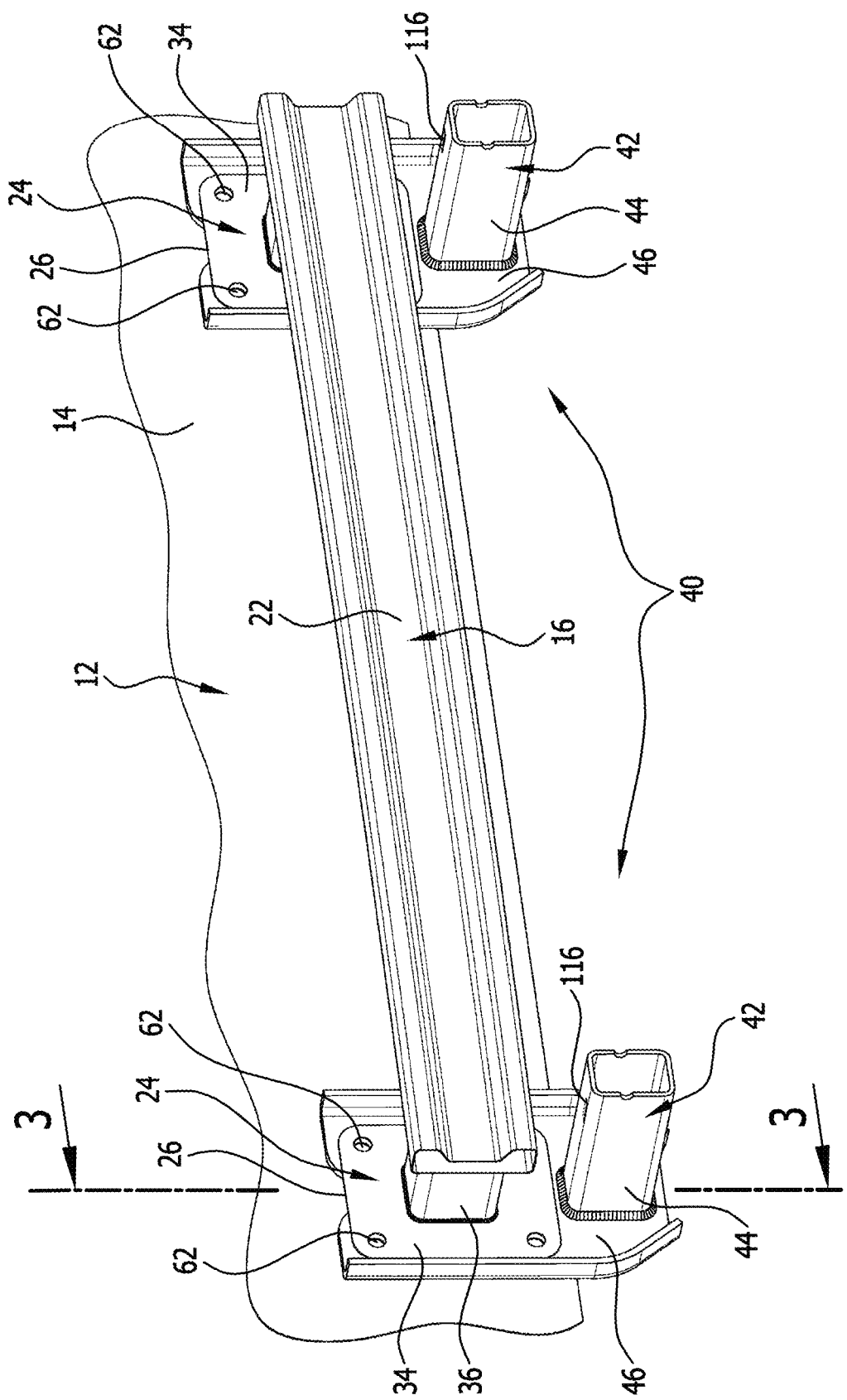
FIG. 2 a first exemplary embodiment of a mounting system according to the invention, comprising two mounting receptacles, which are connected to the mounting regions and the mounting attachments by means of mounting carriers, which engage between mounting attachments of the impact or crash element and the mounting regions of the motor vehicle body.

An exemplary embodiment, shown in FIG. 1, of a motor vehicle 10 suitable for the invention comprises a motor vehicle body 12; an impact or crash element 16 is arranged on the rear section 14 of said motor vehicle body, which impact or crash element, as shown in FIGS. 1 and 2, has a carrier 22 transverse to a vehicle longitudinal direction 18 for absorbing an impact, which carrier is supported at two mounting regions 26 of the rear section 14 by means of two mounting attachments 24.

Each mounting region 26 of the rear section 14 is formed for example by one of two side members 28 extending in the vehicle longitudinal direction 18 on opposite longitudinal sides of the motor vehicle body 12, which side members for example each also carry a termination plate 32, wherein the termination plate 32, with its side facing the mounting attachment 24, forms the mounting region 26 on the rear section 14.

Each of the mounting attachments 24 preferably comprises a flange plate 34 and a support arm 36, which extends from the flange plate to the carrier 22 and holds the carrier 22 at a spacing from the rear section 14 so that the carrier 22, in the event of a rear-side impact on the motor vehicle body 12, can deform at least initially independently thereof.

The impact and crash element 16 is also preferably covered by a bumper unit 38, which is held on the rear section 14 so as to be visible and is provided fundamentally for the visual design of the rear section, but for example in the event of a rear impact on the motor vehicle 10 has an insignificant influence on the absorption of forces.

In order to be able to mount a load carrier or a trailer coupling on a motor vehicle 10 of this kind, in particular the motor vehicle body 12 thereof on its rear section 14, a set 40 of mounting receptacles 42 is provided for releasable fixing of a load carrier or of a trailer coupling, which mounting receptacles for example each have a receiving sleeve 44, which are used to receive mounting elements described hereinafter in detail.

For example, the receiving sleeves 44 are formed here as sleeve bodies that are rectangular in cross section.

Figure 3:
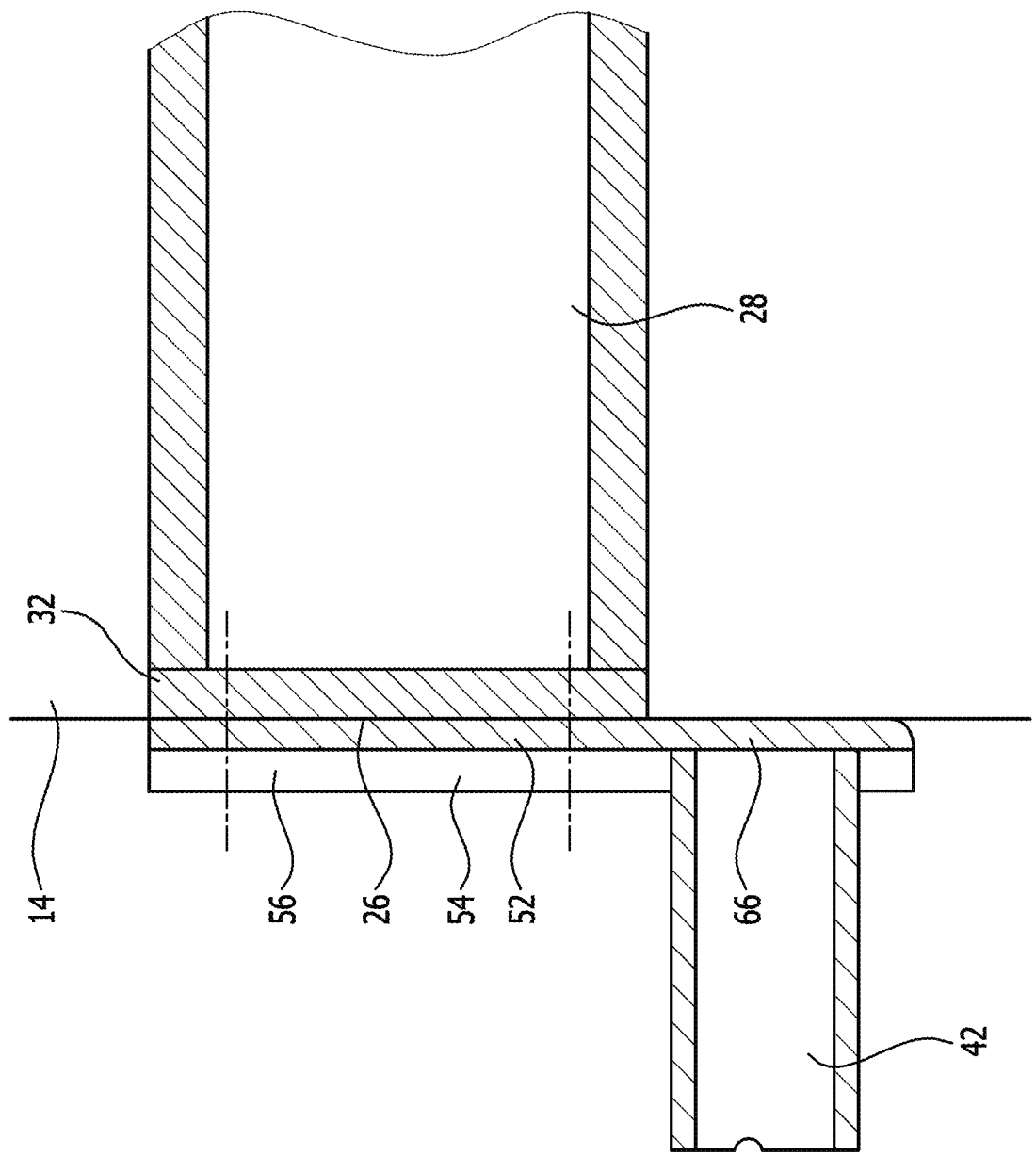
FIG. 3 a longitudinal section along line 3-3 in FIG. 2.

To connect these mounting receptacles 42 to the motor vehicle body 12, each of these mounting receptacles 42 is fixed to a mounting carrier 46, which, as shown in FIGS. 2 and 3, lies directly on the corresponding mounting region 26 of the rear section 14 and thus can be clamped between the corresponding mounting attachment 24 of the impact or crash element 16 and the mounting region 26, so that the corresponding mounting carrier 46 on the one hand can be supported on the corresponding mounting region 26 of the rear section 14 in order to absorb forces and on the other hand is connected to the mounting attachment 24 of the impact and crash element 16, which is likewise supported by means of the corresponding mounting carrier 46 on the mounting region 26 of the rear section 14.

Figure 4:
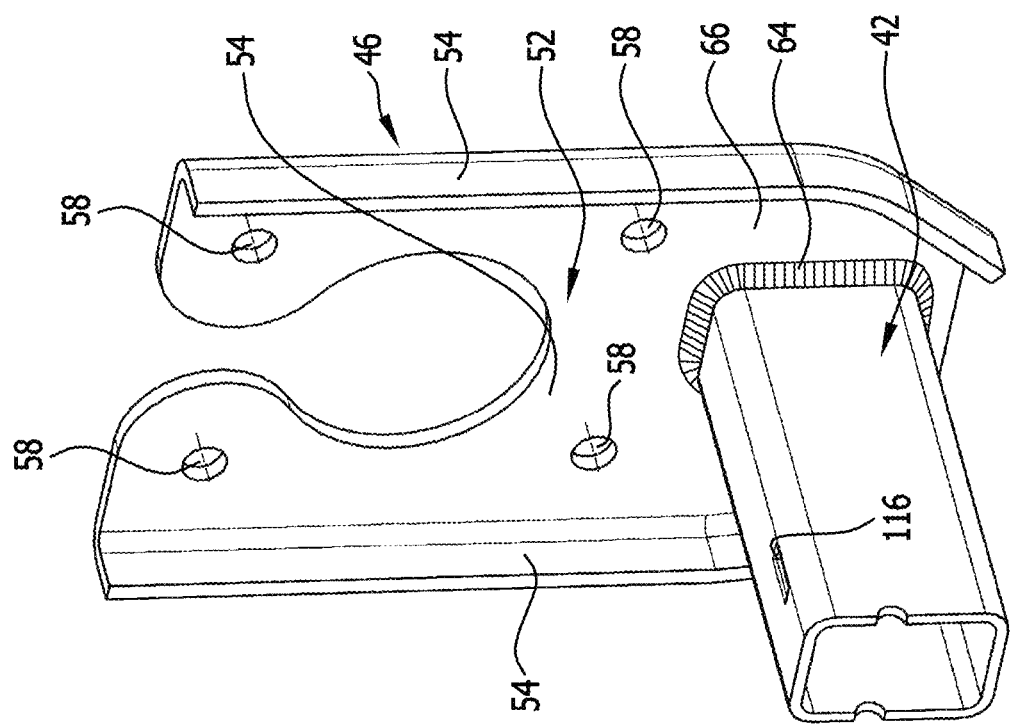
FIG. 4 a perspective view of a mounting receptacle with the associated mounting carrier.

The mounting carrier 46 is preferably formed not exclusively as a flat plate, but, as shown in FIGS. 2 and 4, has a central body 52, which for example is formed as a plate, which in order to save weight is provided with a recess, and also with reinforcements connected to the central body 52, in particular formed as reinforcements 54 molded integrally on the central body, which reinforcements in the shown case according to FIG. 4 are realized by turned-up edges 54 running laterally of the central body 52.

Instead of turned-up edges 54, it is also possible here to provide beads or folds, in particular laterally of the central body 52.

The central body 52 is formed here in particular such that it forms a central support region 56, on which the mounting attachments 24 of the impact or crash element 16, in particular with the flange plates 34, are supportable over the entire surface, which central support region can thus be clamped between the corresponding mounting attachment 24 and the corresponding mounting region 26.

The support region 56 furthermore also has openings 58, which are arranged congruently with corresponding openings 62 in the flange plates 34 and thus allow the corresponding flange plate 34 to be screwed to the central body 52 of the mounting carrier 46 and the mounting region 26.

Furthermore, in the solution according to the invention, the mounting receptacles 42 are welded by means of an end face 64 to a holding region 66 of the central body 52, wherein the reinforcements 54 extend both along the support region 56 and the holding region 66 in order to thus fix the holding region 66 relative to the support region 56 in a bend-proof manner, in particular rigidly.

As shown in FIG. 5, a mounting element 82 of a set 80 of mounting elements can be inserted into an inner receiving space 68 of each of the mounting receptacles 42 of the set 40 of mounting receptacles, wherein, as shown in detail in FIGS. 5 to 8, each of these mounting elements 82 has a guide body 84, which is insertable into the corresponding mounting receptacle 42, in particular the receiving sleeve 44 of the corresponding mounting receptacle 42, in an insertion direction 86 and is guided both against a movement transverse to the insertion direction 86 on account of its outer contour and against a rotation about the insertion direction 86 through the mounting receptacle 42, in particular the receiving sleeve 44 thereof.

In particular, the guide body 84 comprises a C-shaped main body 88 and a support body 92 inserted into the main body 88, so that the main body 88 with its middle limb 94 on the one hand and the support body 92 on the other hand forms a lateral guide for the mounting element 82 and with its two side limbs 96 and 98 secures the mounting element 82 in the receiving sleeve 44 of the mounting receptacle 42 against movements parallel to a vertical direction.

The guide body 84 is furthermore also provided with stops 102 protruding beyond the guide body on both sides, which stops delimit the insertion of the guide body 84 into the receiving space 68 of the corresponding mounting receptacle 42, in particular of the corresponding receiving sleeve 44, by abutting against the end face 104 furthest away from the mounting carrier 46.

To fix each mounting element 82 in the corresponding mounting receptacle 42, the mounting element 82 in question is provided with a securing unit 112, which has a securing body, for example a securing hook 114, which cooperates with a securing receptacle 116, for example formed in the manner of an aperture in the mounting receptacle 42, in particular the receiving sleeve 44 thereof, in order to be able to secure the mounting element 82, in its position inserted into the corresponding mounting receptacle 42, against a movement opposite the insertion direction.

Here, the securing body 114 is acted on by means of a spring element 118 such that the securing body 114, when the mounting element 82 is inserted into the mounting receptacle 42, aims to come into engagement with the securing receptacle 116.

In the simplest case, the securing body 114 is mounted rotatably about a pin forming the stops 102 and is acted on by the spring element 118 in the direction of a pivoting movement into the position engaging in the securing receptacle 116.

Figure 10:
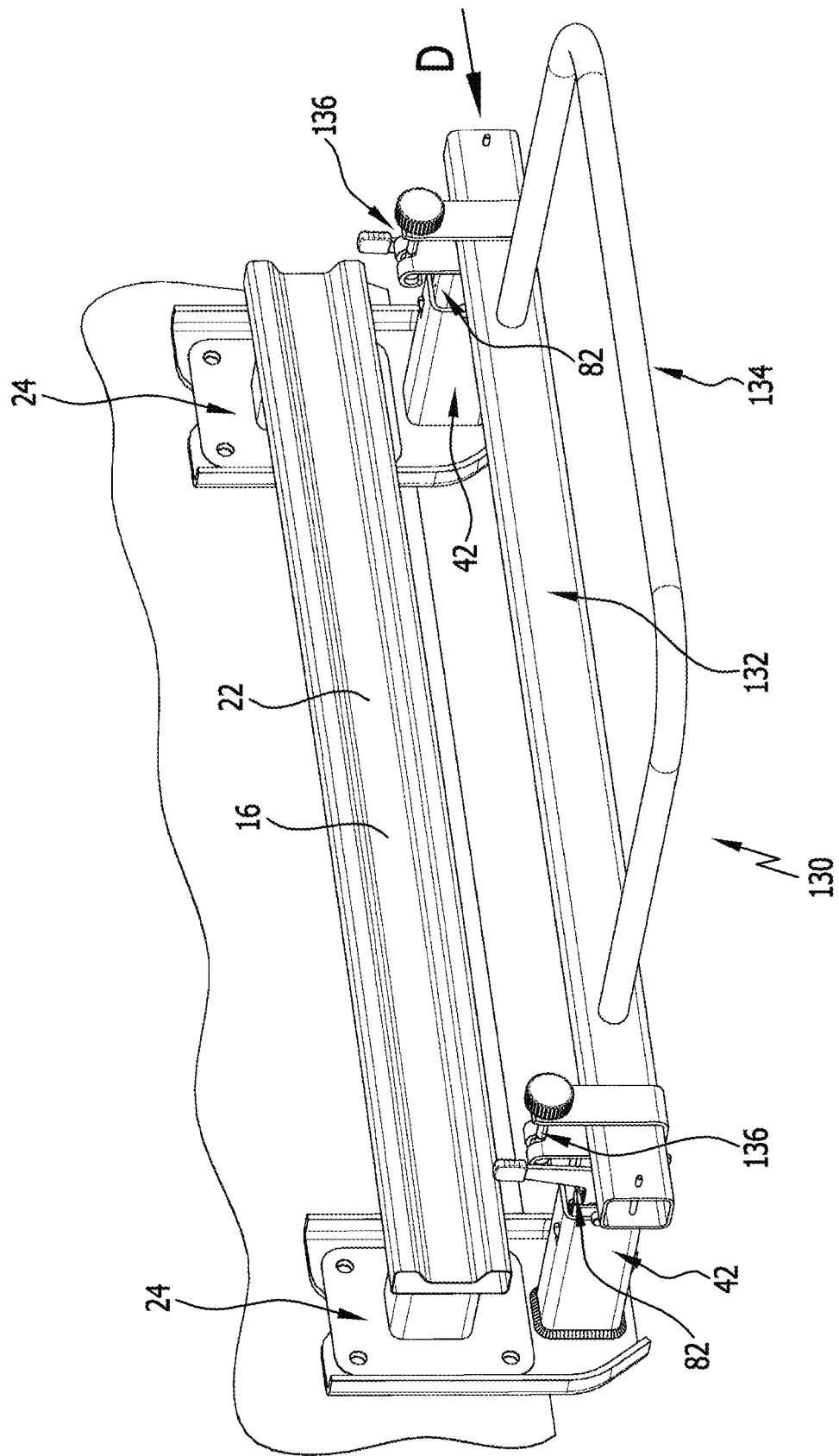
FIG. 10 a representation similar to FIG. 9 with a load carrier held in the mounting elements.
Figure 11:
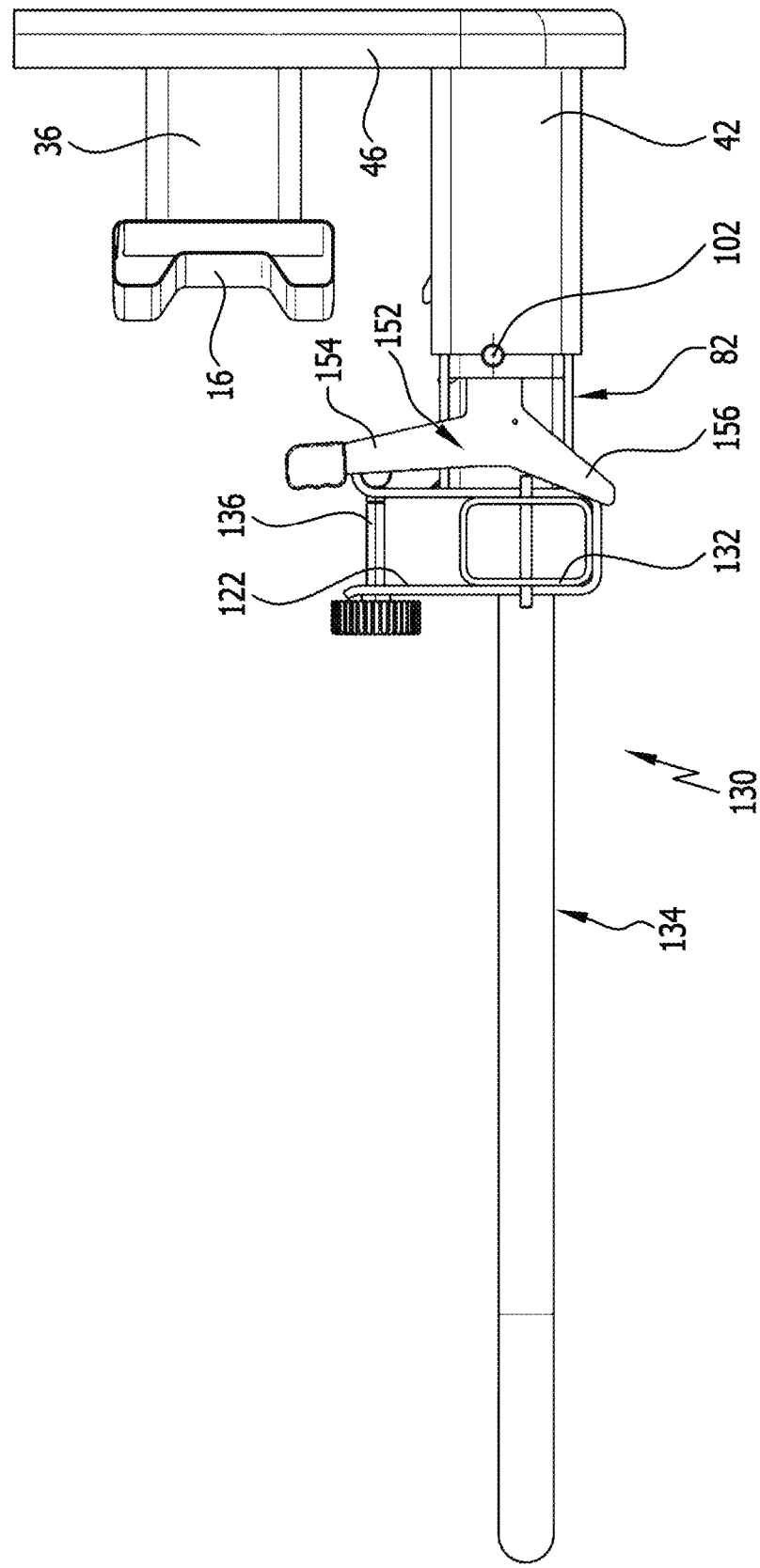
FIG. 11 a side view in the direction of the arrow D in FIG. 10.

As can be seen in particular in FIGS. 5 to 9, each mounting element 82 comprises an approximately U-shaped load receptacle 122 held on the guide body 84, wherein the load receptacles 122 in the set 80 of mounting elements 82, in the state inserted into the set 40 of mounting receptacles 42, are aligned with one another so that, as shown in FIGS. 10 and 11, a carrier base 132 of a load carrier 130 having a carrier frame 134 is insertable into the load receptacles 122, and for example also comprises clamping elements 136 associated with the load receptacles 122, by means of which clamping elements, as shown in FIG. 7, the load receptacles 122 are fixable in a force-locking manner to the carrier base 132, which for example is formed as square tubes engaging in the load receptacles 132, by moving towards one another the load receptacle receiving limbs 142 and 144, which extend starting from a receptacle base 146.

Figure 8:
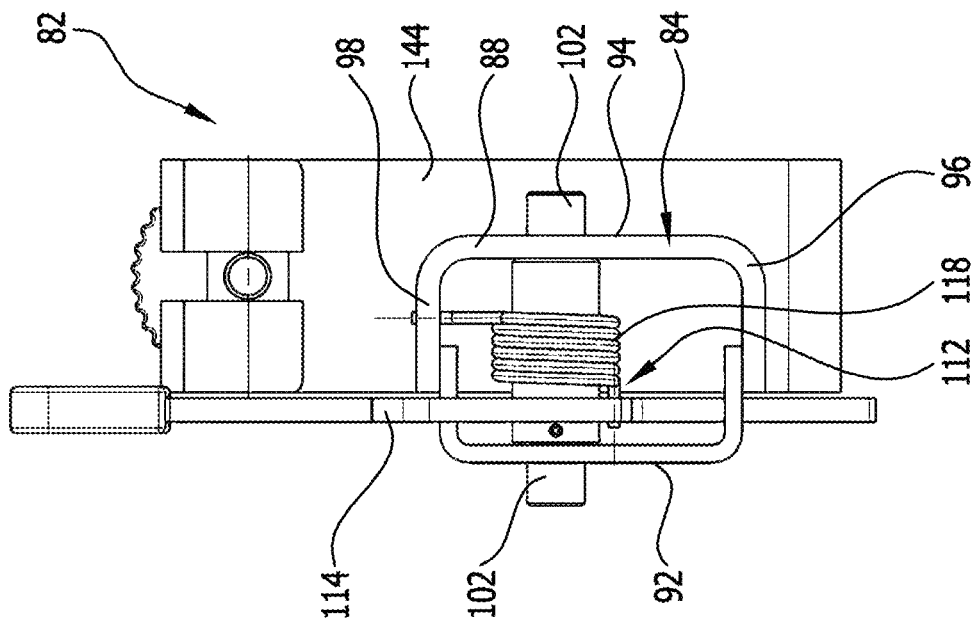
FIG. 8 a plan view of the mounting element with a view in the direction of the arrow C in FIG. 7.
Figure 6:
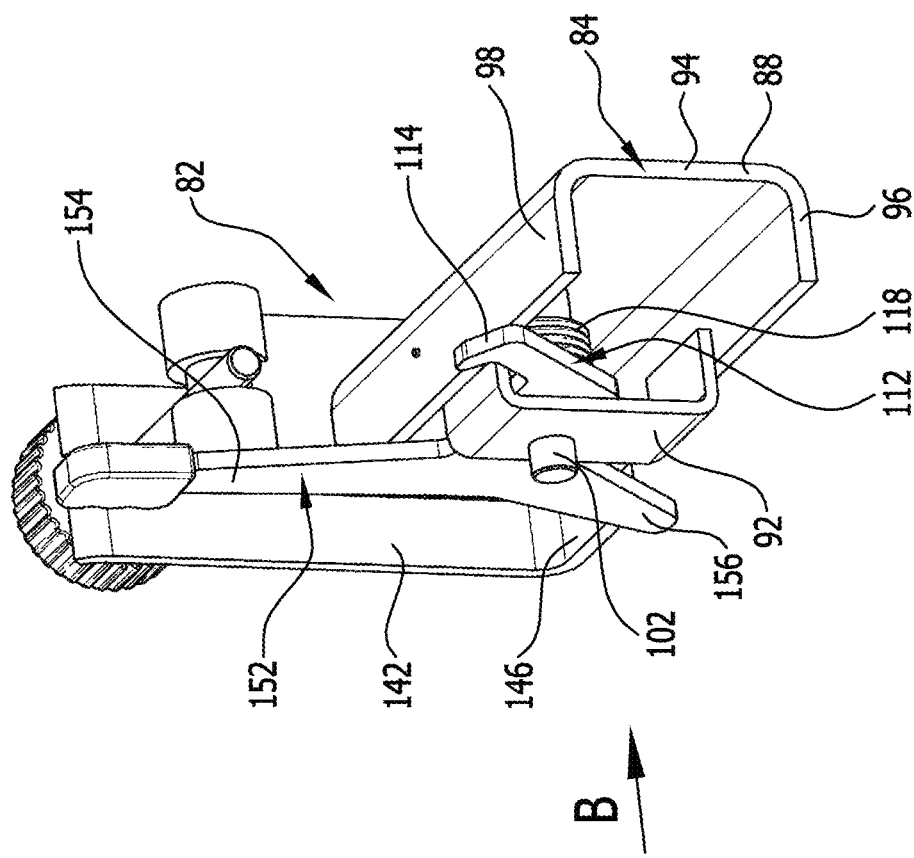
FIG. 6 a perspective representation of a mounting element with a view in the direction of an arrow A in FIG. 5.
Figure 9:
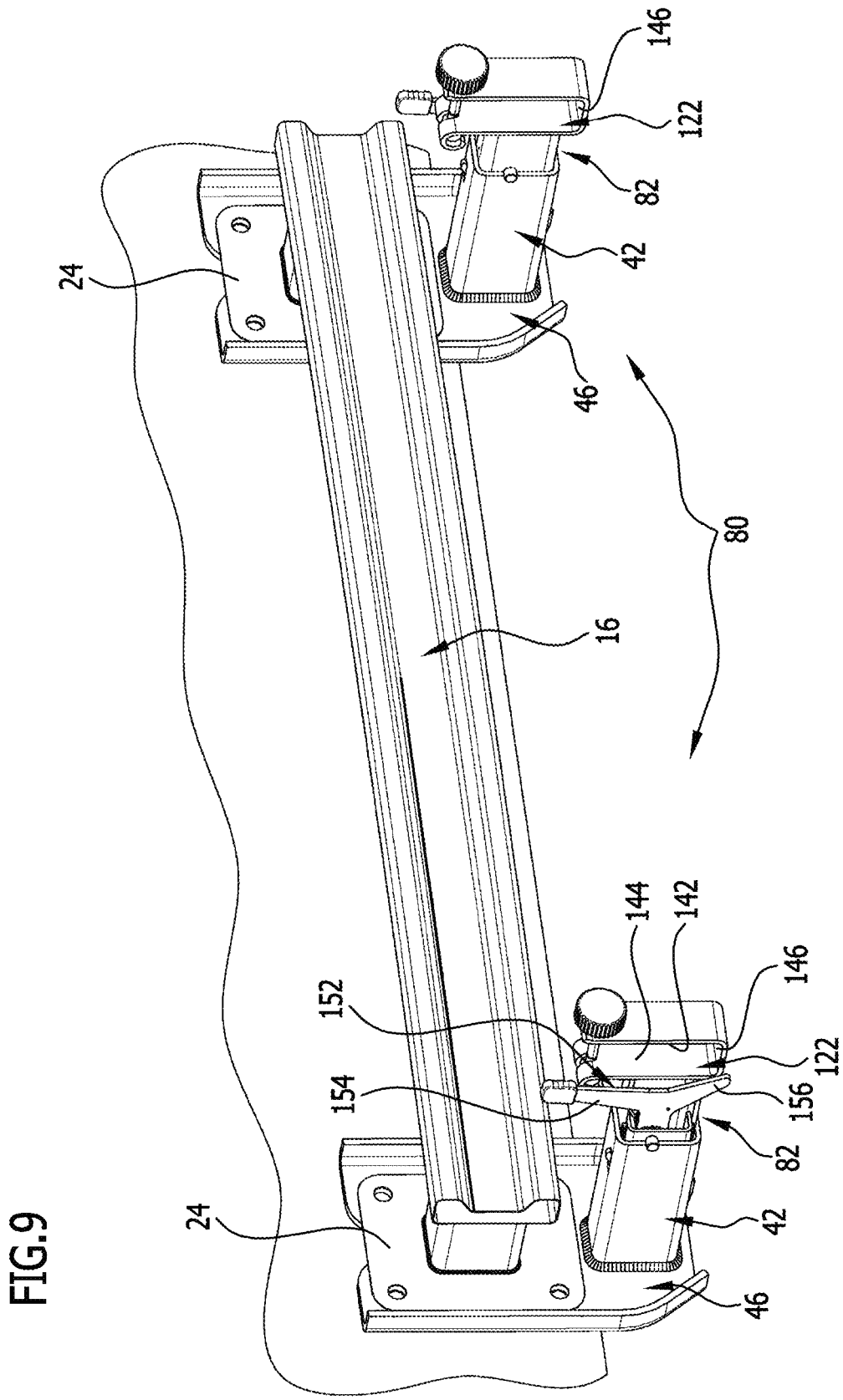
FIG. 9 a representation similar to FIG. 5 with mounting elements inserted into the mounting receptacles.

In addition, as shown in FIG. 7, to actuate the securing body 114, in order to be able to move this out from the corresponding securing receptacle 116, a lever arrangement 152 is provided, which has on the one hand a manually actuatable engagement lever 154 and on the other hand a blocking lever 156, wherein the blocking lever 156 prevents a pivoting of the securing body 114 in the direction out from the corresponding securing receptacle 116 if the carrier base 132 of the load carrier 130 is held in the load receptacle 122, since specifically in this case the blocking lever 156, in the event of a pivoting movement of the securing body 114 in the direction out from the corresponding securing receptacle 116, is blocked by the carrier base 132, and the blocking is then canceled only if the carrier base 132 is no longer received in the load receptacle 122, as is shown in FIG. 8.

Figure 12:
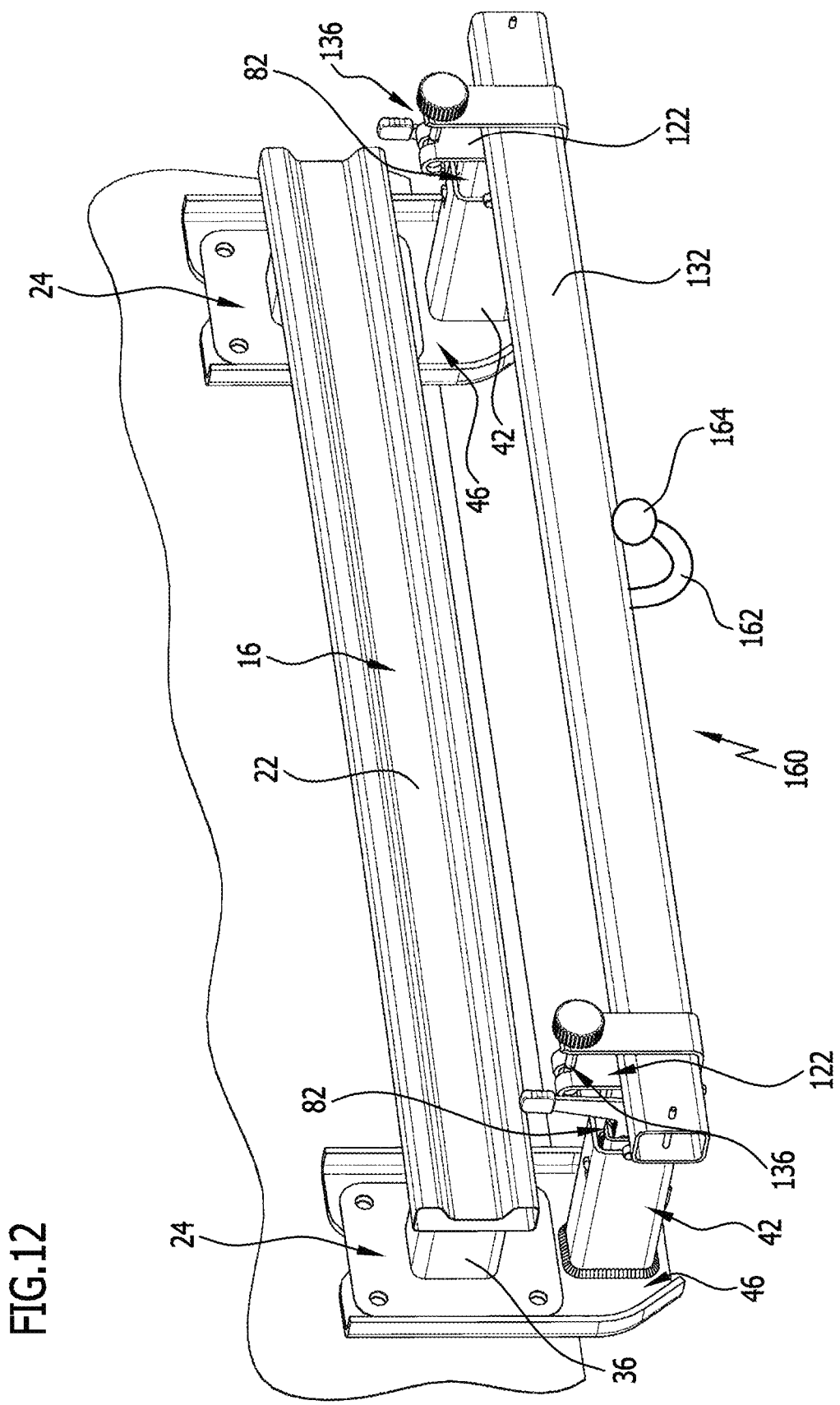
FIG. 12 a representation of a second exemplary embodiment of a mounting system according to the invention with a trailer coupling held by the mounting elements.

In a second exemplary embodiment, the carrier base 132 is not the carrier base of a load support 130, but of a trailer coupling 160, and carries a ball neck 162 with a coupling ball 164, to which a trailer can be coupled in the known manner (FIG. 12).

Figure 13:
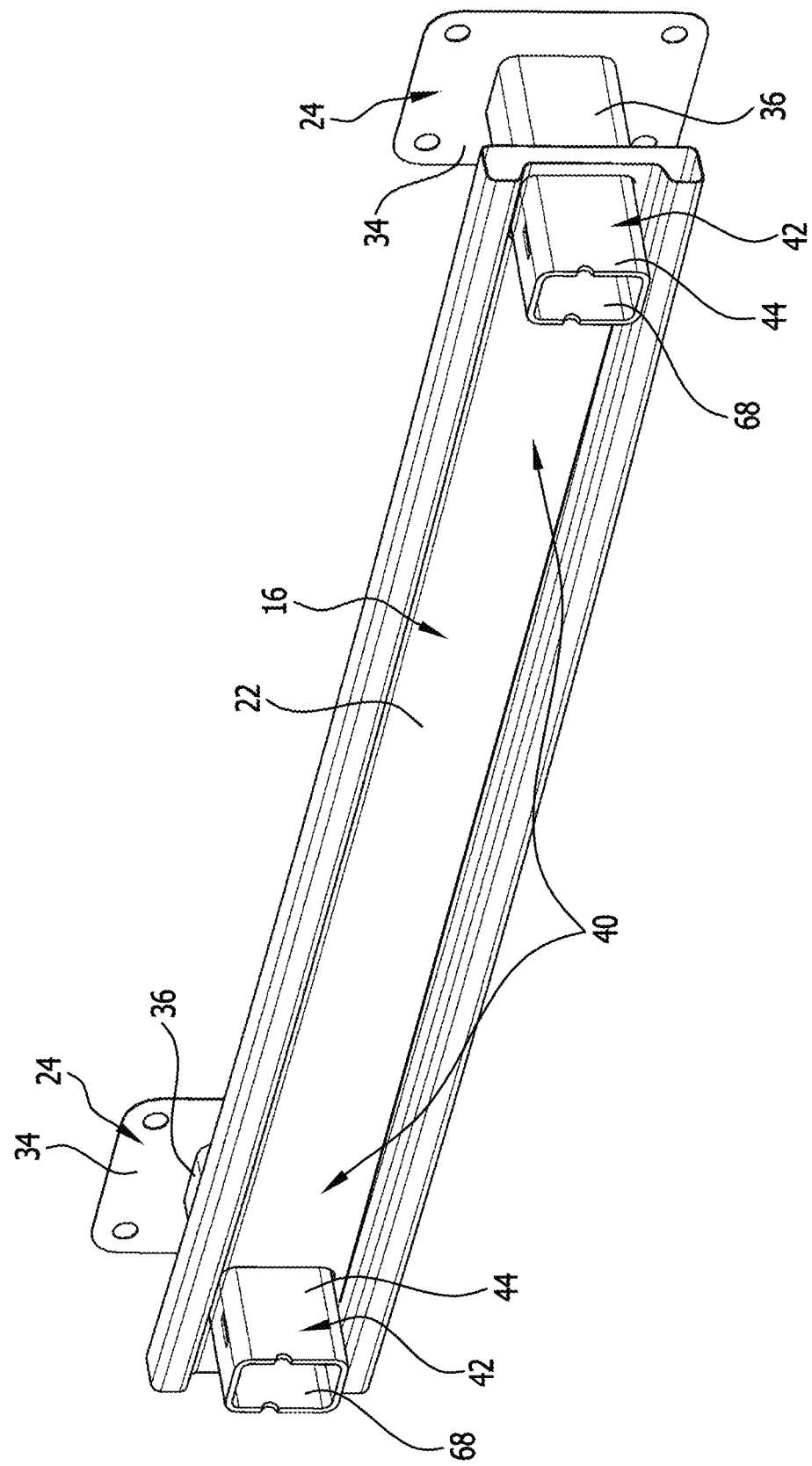
FIG. 13 a perspective representation similar to FIG. 2 of a third exemplary embodiment of a mounting system according to the invention with mounting receptacles arranged on a carrier of the impact or crash element.
Figure 14:
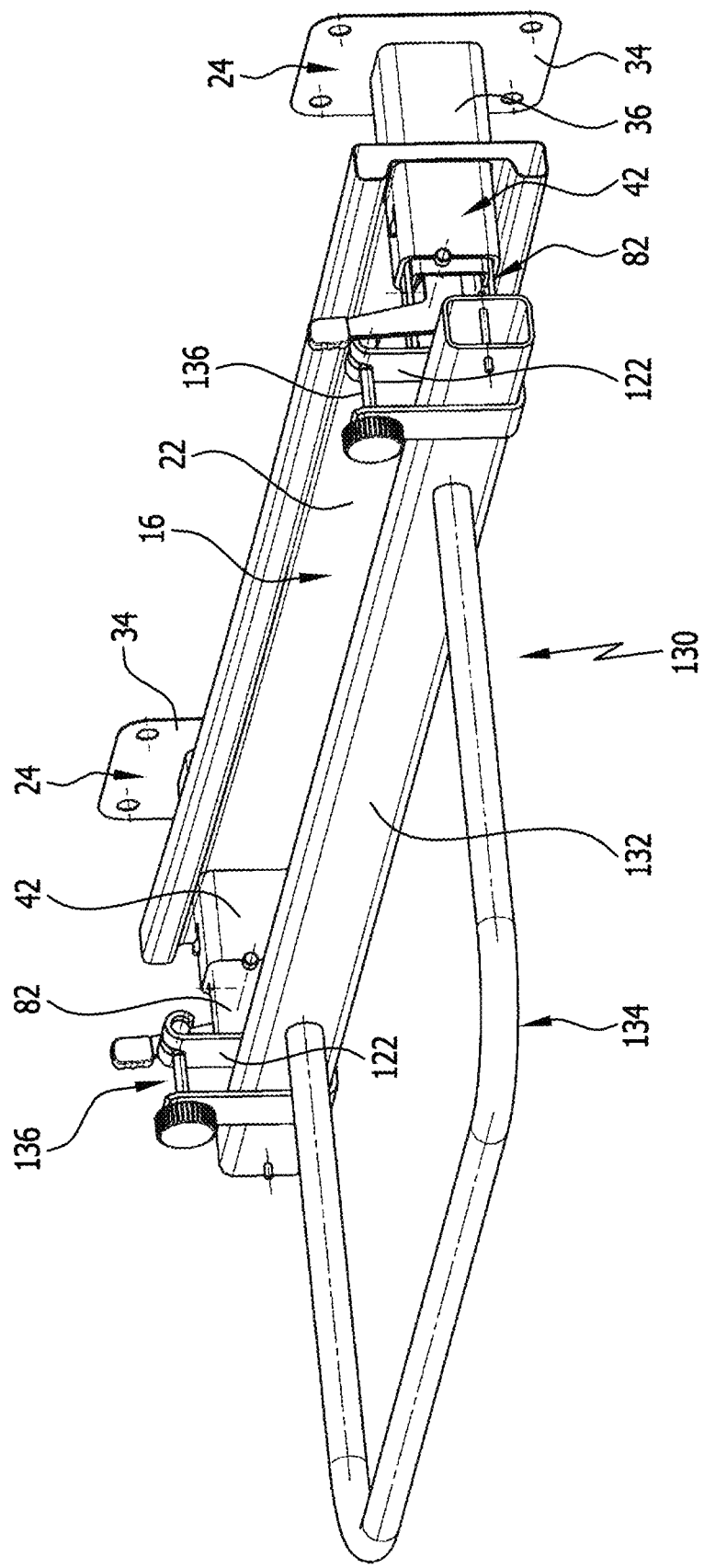
FIG. 14 a representation of a load carrier held by means of mounting elements in the mounting receptacles of the third exemplary embodiment.

In a third exemplary embodiment, shown in FIGS. 13 and 14, the set 40 of mounting receptacles 42 is arranged directly on the carrier 22 of the impact or crash element 16, more specifically in continuation of the support arms 36 extending starting from the flange plates 34, wherein, in the simplest case, the support arms 36 have the same cross section as the receiving sleeves 44 of the mounting receptacles 42, so that in the simplest case the receiving sleeves 44 and the support arms 36 constitute a one-piece part that passes through the corresponding carrier 22 and is welded thereto.

Furthermore, the mounting receptacles 42 are formed similarly to the first exemplary embodiment, so that, as shown in FIG. 14, the same mounting elements 82 as in the first exemplary embodiment are insertable into these mounting receptacles 42, and these mounting elements have load receptacles 122 as in the first exemplary embodiment, into which load receptacles the carrier base 132 of the load carrier denoted as a whole by 130 is insertable, which load carrier is likewise formed similarly to the first exemplary embodiment.

Figure 15:
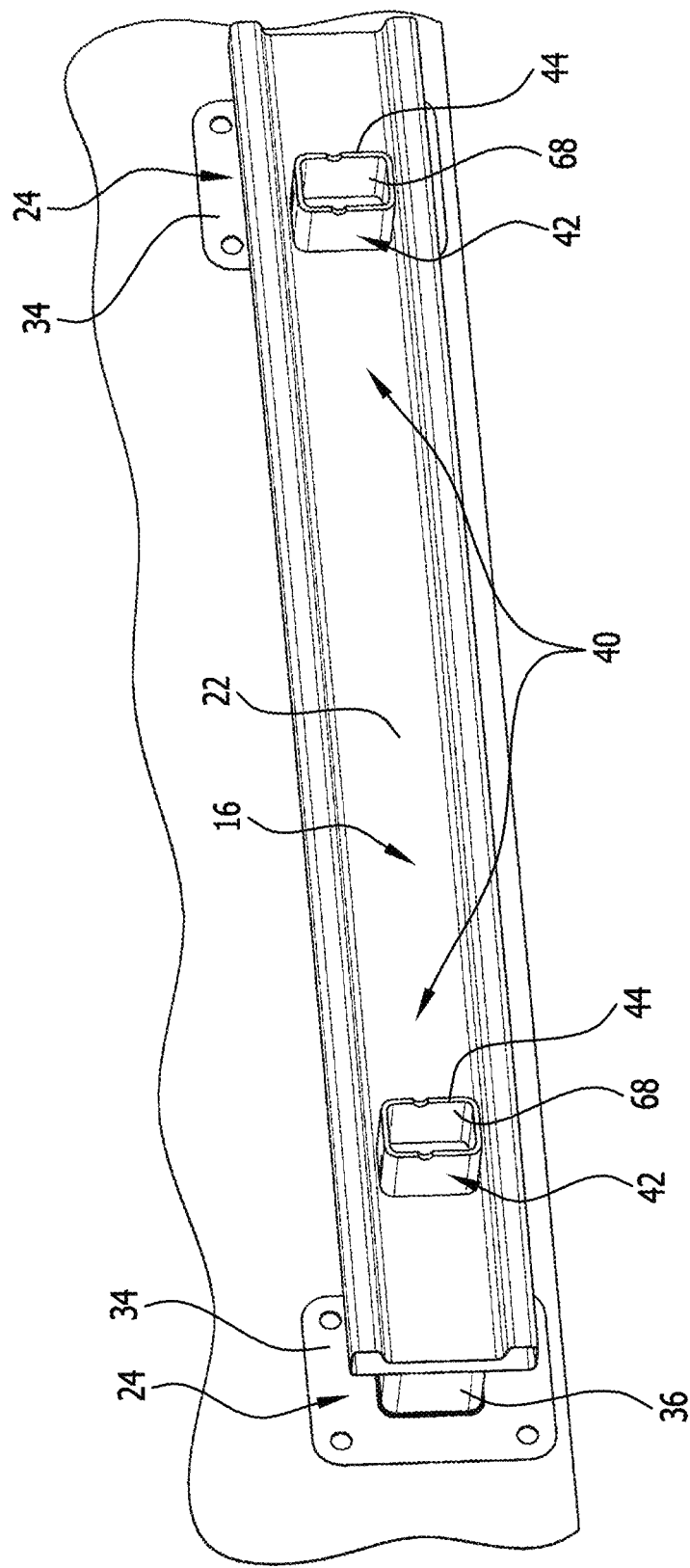
FIG. 15 a perspective representation of a fourth exemplary embodiment of a mounting system according to the invention with mounting receptacles likewise held on the carrier of the impact or crash element.
Figure 16:
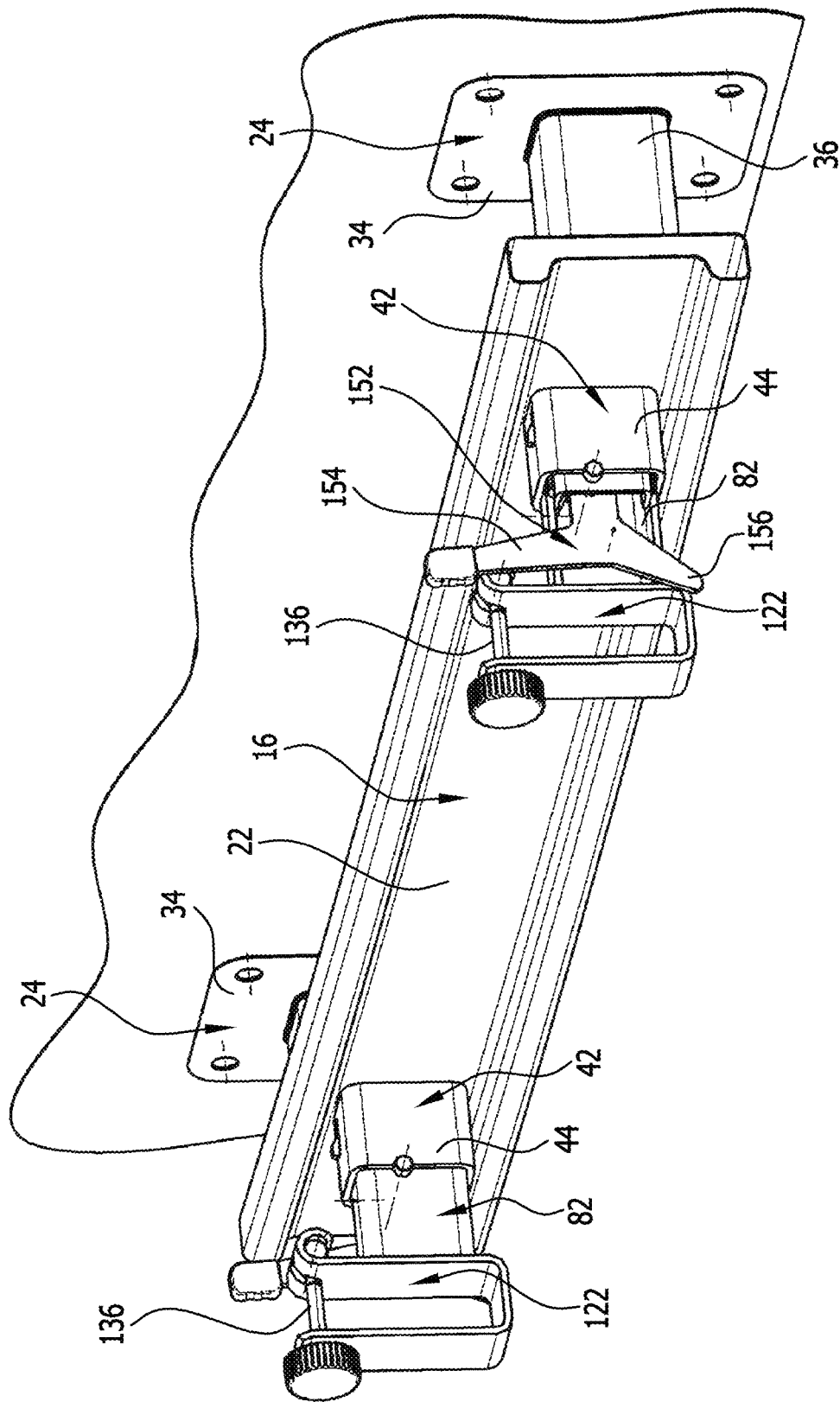
FIG. 16 a representation of the fourth exemplary embodiment of the mounting system according to the invention with mounting elements inserted into the mounting receptacles according to FIG. 14 for receiving a load carrier or a trailer coupling.

In a fourth exemplary embodiment, shown in FIG. 15 and FIG. 16, the set 40 of mounting receptacles 42 is arranged on the carrier 22 of the impact or crash element 16, wherein, however, the mounting receptacles 42 are offset relative to the support arms 36 and thus have a different spacing form one another in the longitudinal direction of the carrier 22 as compared to the support arms 36 in the third exemplary embodiment.

In this exemplary embodiment as well, in particular the receiving sleeves 44 are formed similarly as in the preceding exemplary embodiments, so that the same mounting elements 82 as in the preceding exemplary embodiments can be inserted into these receiving sleeves 44, which mounting elements are provided with the load receptacles 122 similarly as in the preceding exemplary embodiments.

In the fourth exemplary embodiment as well, the carrier base 132 of the load carrier 130 or of the trailer coupling 160 is thus insertable into the load receptacles 122 and fixable therein.

The invention claimed is:

1. A mounting system for a load carrier or a trailer coupling, comprising at least one mounting receptacle, which is mountable on a rear section of a motor vehicle body, an impact or crash element that has a carrier that is deformable in the event of an impact or crash and that is connected by means of mounting attachments to mounting regions of the motor vehicle body, wherein the mounting system has a set of two mounting receptacles, which is configured such that each of the mounting receptacles in the mounted state is connected to the motor vehicle body by means of the mounting regions for the rear-side impact or crash element provided on the motor vehicle body, wherein each the mounting receptacles are connected by a respective one of the mounting regions, and wherein the rear section of the motor vehicle body is formed by side members carrying a termination plate, the termination plate forming the mounting regions with a side facing the mounting attachments.

2. The mounting system in accordance with claim 1, wherein each mounting receptacle is connectable or, in the mounted state, is connected to the corresponding mounting region by means of a mounting carrier.

3. The mounting system in accordance with claim 2, wherein the mounting receptacles are arranged next to the mounting attachments of the impact or crash element by the mounting carrier.

4. A mounting system for a load carrier or a trailer coupling, comprising at least one mounting receptacle, which is mountable on a rear section of a motor vehicle body, an impact or crash element that has a carrier that is deformable in the event of an impact or crash and that is connected by means of mounting attachments to mounting regions of the motor vehicle body, wherein the mounting system has a set of two mounting receptacles, which is configured such that each of the mounting receptacles in the mounted state is connected to the motor vehicle body by means of the mounting regions for the rear-side impact or crash element provided on the motor vehicle body, wherein each the mounting receptacles are connected by a respective one of the mounting regions;
   wherein the mounting receptacles are arranged next to the mounting attachments of the impact or crash element by a mounting carrier; and
   wherein the mounting receptacles are arranged, by means of the mounting carrier, below the mounting attachments of the impact or crash element in the direction of the force of gravity.

5. A mounting system for a load carrier or a trailer coupling, comprising at least one mounting receptacle, which is mountable on a rear section of a motor vehicle body, the mounting system has a set of two mounting receptacles, which is configured such that each of the mounting receptacles in the mounted state is connected to the motor vehicle body by means of a mounting region for a rear-side impact or crash element provided on the motor vehicle body,
   wherein each mounting receptacle is connectable or, in the mounted state, is connected to the corresponding mounting region by means of a mounting carrier, and
   wherein the mounting carrier for connection to the mounting regions of the motor vehicle body is fixed between a mounting attachment of the impact or crash element and the corresponding mounting region of the motor vehicle body.

6. The mounting system in accordance with claim 2, wherein the mounting carrier has a central body, which is stabilized by at least one reinforcement.

7. A mounting system for a load carrier or a trailer coupling, comprising at least one mounting receptacle, which is mountable on a rear section of a motor vehicle body, an impact or crash element that has a carrier that is deformable in the event of an impact or crash and that is connected by means of mounting attachments to mounting regions of the motor vehicle body, wherein the mounting system has a set of two mounting receptacles, which is configured such that each of the mounting receptacles in the mounted state is connected to the motor vehicle body by means of the mounting regions for the rear-side impact or crash element provided on the motor vehicle body, wherein each the mounting receptacles are connected by a respective one of the mounting regions;
wherein each mounting receptacle is connectable or, in the mounted state, is connected to the corresponding mounting region by means of a mounting carrier;
wherein the particular mounting carrier has a central body, which is stabilized by at least one reinforcement; and
wherein the mounting carrier for connection to the mounting regions of the motor vehicle body is fixed between a mounting attachment of the impact or crash element and the corresponding mounting region of the motor vehicle body, wherein the central body has a support region, which is fixable between the mounting region and the corresponding mounting attachment.

8. The mounting system in accordance with claim 6, wherein the central body has a holding region, which carries the mounting receptacle.

9. The mounting system in accordance with claim 7, wherein the support region and the holding region are connected to one another in a rigid manner by the at least one reinforcement.

10. The mounting system in accordance with claim 1, wherein each of the mounting receptacles is connectable to a mounting element.

11. The mounting system in accordance with claim 10, wherein the mounting receptacles are sleeve-like.

12. The mounting system in accordance with claim 10, wherein mounting elements are mountable to the mounting receptacles and fixable thereto, which mounting elements are in turn provided with load receptacles, which allow a connection to a load carrier or a trailer coupling.

13. The mounting system in accordance with claim 11, wherein each mounting element has a guide body, by means of which the mounting element is mountable to the mounting receptacle and is fixable thereto against transverse movements and/or rotations about the insertion direction.

14. The mounting system in accordance with claim 11, wherein, by means of stops, each mounting element is positionable in a defined manner in the insertion direction relative to the corresponding mounting receptacle.

15. The mounting system in accordance with claim 11, wherein each mounting element is provided with a securing unit, by means of which the mounting element is fixable, in the position inserted into the mounting receptacle, against a movement opposite the insertion direction.

16. The mounting system in accordance with claim 15, wherein the securing unit has a securing body, which is configured to be brought into engagement with a securing receptacle of the mounting receptacle.

17. The mounting system in accordance with claim 11, wherein mounting elements are provided with load receptacles, which allow a connection to a load carrier or a trailer coupling wherein a carrier base of a load carrier or of a trailer coupling is fixable or, in the operating state, is fixed in the load receptacle of each mounting element.

18. The mounting system in accordance with claim 17, wherein there are associated with each load receptacle clamping elements, by means of which the carrier base is fixable in a force-locking manner in the respective load receptacle.

19. The mounting system in accordance with claim 17, wherein each load receptacle is U-shaped, for example in order to receive the carrier base.

20. The mounting system in accordance with claim 16, wherein the securing body is blocked by a blocking element against a movement out from the securing receptacle when the load carrier or the trailer coupling is held in the corresponding load receptacle.

21. The mounting system in accordance with claim 1, wherein the set of two mounting receptacles is held on the impact or crash element.

22. The mounting system in accordance with claim 21, wherein the mounting receptacles are connected to the carrier of the impact or crash element.

23. The mounting system in accordance with claim 21, wherein the mounting receptacles are arranged on the carrier in continuation of the mounting attachments.

24. The mounting system in accordance with claim 21, wherein the mounting receptacles are arranged offset relative to the mounting attachments of the impact or crash element.

25. The mounting system in accordance with claim 21, wherein the mounting receptacles are connected non-releasably to the carrier of the impact or crash element.

26. The mounting system of claim 1, wherein the side members extend in a vehicle longitudinal direction on opposite longitudinal sides of the motor vehicle body to carry the termination plate.

27. A mounting system for a load carrier or a trailer coupling, comprising at least one mounting receptacle, which is mountable on a rear section of a motor vehicle body, an impact or crash element that has a carrier that is deformable in the event of an impact or crash and that is connected by means of mounting attachments to mounting regions of the motor vehicle body, wherein the mounting system has a set of two mounting receptacles, which is configured such that each of the mounting receptacles in the mounted state is connected to the motor vehicle body by means of the mounting regions for the rear-side impact or crash element provided on the motor vehicle body, wherein each the mounting receptacles are connected by a respective one of the mounting regions, wherein each mounting receptacle is connectable or, in the mounted state, is connected to the corresponding mounting region by means of a mounting carrier, and wherein the mounting receptacles are arranged aside of the mounting attachments of the impact or crash element by the mounting carrier.

28. The mounting system in accordance with claim 27, wherein the mounting receptacles are offset from the impact or crash element so that the mounting receptacles are accessible without passing through the impact or crash element.

* * * * *